(12) United States Patent
Fischer et al.

(10) Patent No.: US 9,440,531 B2
(45) Date of Patent: Sep. 13, 2016

(54) ELECTRIC POWER TRAIN FOR THE STEERABLE AXLE OF A MOTOR VEHICLE

(71) Applicant: Schaeffler Technologies GmbH & Co. KG, Herzogenaurach (DE)

(72) Inventors: Raphael Fischer, Herzogenaurach (DE); Thorsten Schubert, Herzogenaurach (DE); Thomas Mehlis, Kleinsendelbach (DE); Christian Witt, Vestenbergsgreuth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/375,718

(22) PCT Filed: Jan. 17, 2013

(86) PCT No.: PCT/EP2013/050767
§ 371 (c)(1),
(2) Date: Jul. 30, 2014

(87) PCT Pub. No.: WO2013/113561
PCT Pub. Date: Aug. 8, 2013

(65) Prior Publication Data
US 2014/0374185 A1 Dec. 25, 2014

(30) Foreign Application Priority Data

Feb. 2, 2012 (DE) .................. 10 2012 201 577

(51) Int. Cl.
B60K 17/30 (2006.01)
B60K 7/00 (2006.01)
(Continued)

(52) U.S. Cl.
CPC ................. *B60K 17/30* (2013.01); *B60K 6/52* (2013.01); *B60K 7/0007* (2013.01); *B60K 6/48* (2013.01);
(Continued)

(58) Field of Classification Search
CPC ..... B60K 17/30; B60K 17/12; B60K 17/145
USPC ........................................ 180/253
See application file for complete search history.

(56) References Cited

U.S. PATENT DOCUMENTS 1,651,153 A 11/1927 Reilly
4,632,203 A 12/1986 Krude
(Continued)

FOREIGN PATENT DOCUMENTS

DE 3507435 9/1985
DE 3725620 2/1989
(Continued)

*Primary Examiner* — Tony Winner
*Assistant Examiner* — Marlon Arce
(74) *Attorney, Agent, or Firm* — Davidson, Davidson & Kappel, LLC

(57) ABSTRACT

A power-train is provided for a driven, steerable axle of a motor vehicle. To reduce the size of the turning radius of the vehicle, the power train includes a left drive shaft that is fixedly connected in terms of drive to a left steerable wheel; a right drive shaft that is fixedly connected in terms of drive to a right steerable wheel; and a drive unit configured between the drive shafts for driving the drive shaft; the drive shafts being configured as articulated shafts, each having a wheel-proximal articulated joint and a wheel-distal articulated joint; and said articulated joints each having at least one axis of rotation with the same orientation for all articulated joints. The drive unit is designed for transmitting an electromotively generated torque to the drive shafts, and having a body suspension that allows the drive unit to rotate relative to the body about a swivel axis that extends in parallel to the axes of rotation having the same orientation.

4 Claims, 3 Drawing Sheets

(51) Int. Cl.
  *B60K 6/52* (2007.10)
  *B60K 17/12* (2006.01)
  *B60K 17/14* (2006.01)
  *B60K 6/48* (2007.10)

(52) U.S. Cl.
  CPC .............. *B60K 17/12* (2013.01); *B60K 17/145* (2013.01); *B60K 2007/0053* (2013.01); *Y02T 10/6221* (2013.01); *Y02T 10/6265* (2013.01)

(56) References Cited

U.S. PATENT DOCUMENTS

| | | | | |
|---|---|---|---|---|
| 4,697,662 | A | * | 10/1987 | Zollmeyer ............. B60K 17/30 180/256 |
| 4,733,744 | A | * | 3/1988 | Glaze ...................... B60B 35/14 180/256 |
| 5,829,542 | A | | 11/1998 | Lutz |
| 8,091,677 | B2 | * | 1/2012 | Murty ............................ 180/293 |
| 2003/0127260 | A1 | * | 7/2003 | Angeles ........................ 180/23 |
| 2004/0094928 | A1 | | 5/2004 | Amanuma |
| 2004/0263112 | A1 | * | 12/2004 | Morgante .............. H02P 27/042 318/801 |
| 2007/0251748 | A1 | | 11/2007 | Downs |
| 2011/0245033 | A1 | * | 10/2011 | Sato ....................... B60K 6/442 477/3 |

FOREIGN PATENT DOCUMENTS

| | | |
|---|---|---|
| DE | 4421425 | 8/1995 |
| DE | 102009002440 | 10/2010 |
| DE | 102010024191 | 12/2011 |
| EP | 0224144 | 6/1987 |
| JP | 2004161157 | 6/2004 |
| JP | 2005324606 | 11/2005 |

\* cited by examiner

ELECTRIC POWER TRAIN FOR THE STEERABLE AXLE OF A MOTOR VEHICLE

The present invention relates to a power train for a motor vehicle. Power trains of this kind are used in vehicles having front-wheel or all-wheel drive where the steerable axle also transmits a torque for propelling the vehicle to the wheels that are coupled to the axle.

BACKGROUND

The German Patent Application DE 3507435 A1, for example, describes a power train. It discusses a drive shaft that connects an outer constant-velocity joint within a wheel configuration to an inner constant-velocity joint within a differential housing. The two joints are necessary to allow a turning of the wheel that is coupled to the drive shaft. During turning, the shaft undergoes articulation at both articulated joints thereof. The thereby occurring change in the length of the drive shaft is compensated by an articulated bearing having a sliding-fit configuration.

The turning angle of the articulated shaft is limited by the maximum articulation angle of the wheel-side joint and the length of the articulated shaft between the gear transmission- and wheel-side joint. As a result, the maximum steering angle for front-wheel drive vehicles is generally smaller than for rear-wheel drive vehicles whose steerable axle is not driven.

As fossil fuels become ever more scarce, there is an increased focus on electric and hybrid drive concepts where at least one motor vehicle axle is driven by an electric motor. Thus, the German Patent Application DE 10 2010 024 191 A1 describes a drive system for a motor vehicle having an electric power train which includes a gear transmission that is operatively connected to a first and a second axle. The electric power train includes a plurality of individually controllable electric motors that transmit a torque via the gear transmission and via front-axle and rear-axle differential gears to the axles of the vehicle.

SUMMARY OF THE INVENTION

It is an object of the present invention to reduce the size of the turning radius of a vehicle having a driven, steerable axle.

The present invention provides a power train including
a left drive shaft that is fixedly connected in terms of drive to a left steerable wheel;
a right drive shaft that is fixedly connected in terms of drive to a right steerable wheel; and
a drive unit configured between the drive shafts for driving the same; the drive shafts being configured as articulated shafts, each having a wheel-proximal articulated joint and a wheel-distal articulated joint; and said articulated joints each having at least one axis of rotation with the same orientation for all articulated joints; the drive unit being designed for transmitting an electromotively generated torque to the drive shafts, and having a suspension from the vehicle body that allows the drive unit to rotate relative to the vehicle body about a swivel axis that extends in parallel to the axes of rotation having the same orientation.

Advantageous specific embodiments of the present invention will become apparent from the dependent claims.

It is an underlying realization of the present invention that, at a predefined maximum articulation angle of the wheel-proximal articulated joint about the axis of rotation, which is essentially oriented orthogonally to the longitudinal and transversal vehicle direction, a larger turning angle of the wheel is attainable when the wheel-distal articulation point, that is formed by the wheel-distal articulated joint, is able to be successfully displaced along a circular path. In response to a clockwise rotation of the wheels, it is a question here of displacing the particular articulation point of the left and right wheel-distal articulated joints counter-clockwise.

It is also an underlying realization of the present invention that such a displacement of said articulation points succeeds in that the drive unit, which is operatively connected to the respective ends of the articulated shafts facing away from the peripheral regions, is swivel-mounted on the vehicle body. The swivel axis must have the same orientation as said axis of rotation of the four articulated joints mentioned.

Finally, it is a further realization of the present invention that said swivel-mounting of the drive unit may only be realized with an appreciable swivel angle by ignoring conventional combustion engine-based drive concepts for driving the steerable axle. Combustion engines must be rigidly coupled to the vehicle body during operation due to the precision required relative to other aggregates, such as the exhaust system, in particular. Merely the movements required for vibration damping are enabled within the narrowest possible limits by rubber mounts. Therefore, the vibration-optimized engine suspension and the mentioned restrictions essentially prevent a combustion engine from swiveling within the suspension thereof.

On the other hand, a swivel-type mounting of an electric motor is unproblematic. It is merely necessary that the electrical connections be configured to permit a swiveling motion. Moreover, connections leading to a cooling circuit must be sufficiently flexible in design.

Thus, increasing the size of the articulation angle by rotational twisting of the drive unit makes possible a larger wheel turning angle without requiring modification to the drive shaft design. The drive unit may be actuated during steering with electromechanical assistance or purely mechanically using suitable kinematics. A change in the length of the left and right drive shaft in response to drive unit swiveling may be compensated by a sliding-fit configuration disposed in the respective drive shaft, in particular in the wheel-distal articulated joint.

One advantageous embodiment of the present invention makes possible a wheel-selective drive by providing that the drive unit include a first electric motor for driving the left drive shaft and a second electric motor for driving the right drive shaft. A significant improvement in driving safety and driving dynamics is attainable because both drive wheels may be driven separately and independently from one another. In particular, a torque vectoring may be realized whereby an additional yaw-angle acceleration is generated by uneven torque distribution at the powered wheels in certain driving situations.

Due to the high torque of electric motors available within a broad speed range, the drive unit may be configured as a direct drive. This means that a gear transmission may be completely eliminated. Moreover, the need for an axle differential gear may also be eliminated due to the wheel-selective drive of the above mentioned specific embodiment.

An installation-space saving embodiment of the present invention is also characterized in that the first and the second electric motors feature rotor shafts that are oriented coaxially to the drive shafts during straight-ahead vehicle travel. Straight-ahead driving is not included in this discussion since the articulation angles of the articulated joints are 0° in this operating state, so that one may speak of exactly one axis of rotation of the drive shaft.

Such an embodiment of the drive unit according to the present invention may be realized as a direct drive or also with the inclusion of a speed-transforming gear transmission. For example, for each of the electric motors, a step-down gear may be advantageously integrated in the drive unit, in particular using a planetary gear in order to be able to use high-speed and, nevertheless, installation space-saving electric motors.

In a further advantageous refinement of the present invention, another variant is characterized in that the drive unit features a first interconnecting gear unit for operatively connecting a first rotor shaft of the first electric motor to the left drive shaft, and a second interconnecting gear unit for operatively connecting a second rotor shaft of the second electric motor to the right drive shaft;

the first and the second interconnecting gear units being configured in a shared housing, and the first electric motor being mounted on the housing on the side facing the left wheel, and the second electric motor being mounted on the housing on the side facing the right wheel.

Here, the shared housing of the two interconnecting gear units, designed, in particular, as spur gear units, is centrally located between the two electric motors. In the case of straight-ahead vehicle travel, the rotor shafts of the two electric motors may be oriented in parallel to the two drive shafts; considered in the direction of travel, however, be forwardly or rearwardly offset from the same. In comparison to a purely coaxial configuration, this allows a somewhat more flexible distribution of the required installation space over the wheel suspension.

However, in another advantageous embodiment, the inventive power train may also be realized using only one electric drive motor, the drive unit having a central electric motor including a rotor shaft for driving both drive shafts, and a differential gear. The differential gear makes possible unequal wheels speeds on the left and right side during cornering. The expression "central" here is merely intended to express that both drive wheels are jointly driven by one motor; therefore, there is no wheel-selective drive. The position of the central electric motor may be selected on the basis of the design specifications of the vehicle in which the power train is to be integrated.

Thus, an advantageous refinement of the present invention is conceivable whereby the rotor shaft of the central electric motor is oriented coaxially to the drive shafts during straight-ahead vehicle travel.

Even if only one traction motor is used, a power train oriented in the longitudinal vehicle direction may be alternatively realized; in the case of straight-ahead driving, the rotor shaft being oriented in the direction of travel; and, considered in the direction of travel, the central electric motor being located forwardly or rearwardly of the differential gear that is configured between the left and right drive shaft. During cornering, the rotor shaft swivels, together with the drive unit, about the swivel axis.

Besides the differential gear, embodiments that make use of a central electric motor may also advantageously provide a gear transmission for stepping down the speed. In the same way as specific embodiments that include a wheel-selective drive, a switchable multistage gear transmission may also be advantageously integrated in the power train.

In comparison to purely combustion engine-based concepts, a motor vehicle based on an electric drive concept and having a drive unit in accordance with one of the previously described specific embodiments not only has a greater potential in terms of ecology, but also features a smaller turning radius. It is self-evident that the latter applies in a comparison to vehicles whose steerable axle is also a powered axle.

The advantage of a smaller turning radius may also be retained in the context of a hybrid drive concept, i.e., a motor vehicle in accordance with the above mentioned embodiment that additionally includes a combustion engine, when the combustion engine is used for driving the non-steered axle. An all-wheel-drive vehicle is thereby obtained that has a greater traveling range due to the additional combustion engine and that features a smaller turning radius in comparison to conventional front-wheel or all-wheel drive vehicles. In the case of such a hybrid concept, it is also conceivable and included in the present invention to provide the drive unit with a switchable coupling and thereby design the electric drive to be activatable or deactivatable.

BRIEF DESCRIPTION OF THE DRAWINGS

The present invention is clarified in greater detail in the following with reference to the exemplary embodiments illustrated in the figures, in which.

Identical reference numerals are used for elements of the present invention having equivalent or essentially equivalent functions.

DETAILED DESCRIPTION

Figure 1:
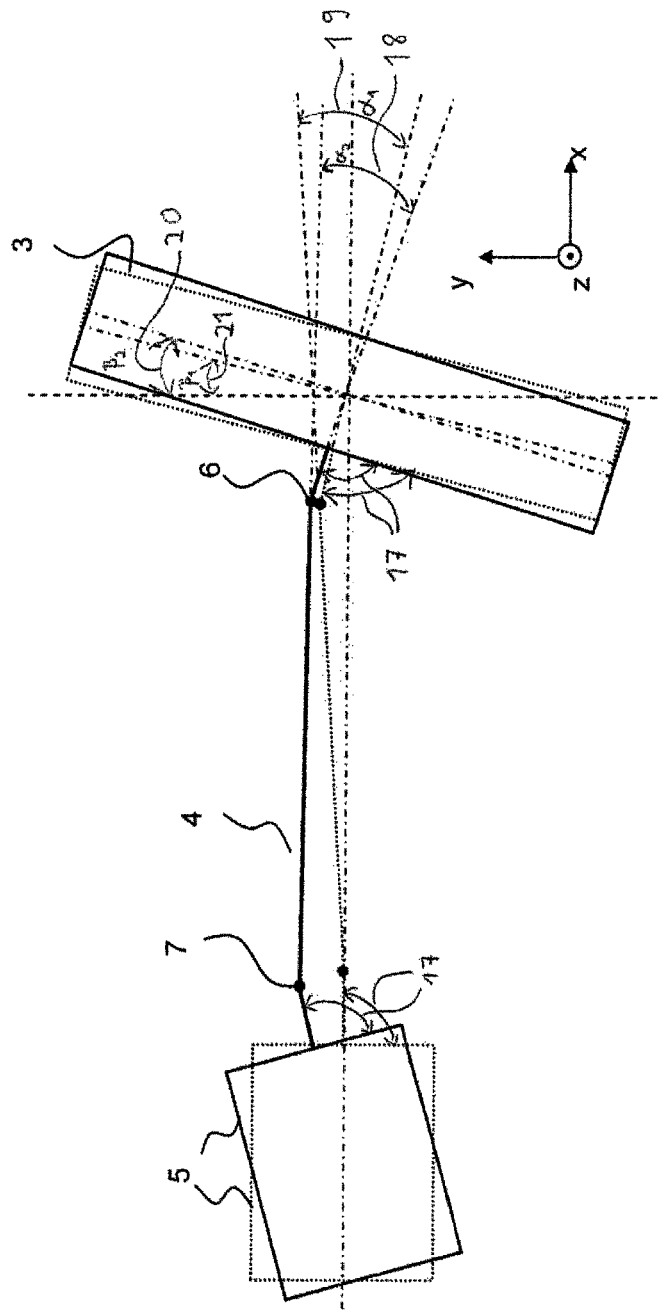
FIG. 1 shows a schematic representation of a maximum possible wheel turning angle in one specific embodiment of the present invention in comparison to a related art variant.

FIG. 1 shows a schematic representation of a maximum possible wheel turning angle in one specific embodiment of the present invention in comparison to a related art variant. A drive unit 5 of the power train, a right drive shaft 4, and a right steerable wheel 3 are shown. Intentionally omitted in FIG. 1 for the sake of clarity are a representation of the left drive side, including a left drive shaft 2 first shown in the following figures, and a left wheel 1 powered by the same.

Right drive shaft 4 has, as does also the left, a wheel-proximal articulated joint 6 and a wheel-distal articulated joint 7. The two articulated joints 6, 7 permit at least one rotational movement of the adjoining partial shafts about the z-axis that is limited relative to the articulation angle. Other potential rotational degrees of freedom are inconsequential for the understanding of the present invention and are, therefore, not discussed further here.

However, in response to a turning of wheel 3, drive shaft 4 also undergoes a change in length, so that a sliding-fit configuration is to be provided. This may be implemented in wheel-distal articulated joint 7, for example.

FIG. 1 illustrates increasing the size of the maximum possible turning angle of wheel 3 by displacing the articulation point, formed by wheel-distal articulated joint 7, counter to the turning angle of wheel 3. To realize this, the drive unit is rotationally mounted about a swivel axis that is likewise oriented in the z-direction and thus extends in parallel to the axes of rotation of articulated joints 6, 7.

Besides a specific embodiment of the present invention illustrated by solid lines, a variant including the same components, but without the inventive swiveling capability of drive unit 5, is shown in dotted lines for further clarification.

Together with the drive unit, the partial shafts of drive shaft 4 facing drive unit 5 always subtend a right angle 17. This applies equally to the partial shafts of drive shaft 4, which face wheel 3, relative to the longitudinal axis of wheel 3.

Since the same articulated joints 6, 7 are used in both illustrated specific embodiments, articulation angles 18, 19 of wheel-proximal articulated joint 6 are also be to regarded as the same for both configurations. This means it holds that $\alpha_1 = \alpha_2$.

Decisive, however, for the turning radius of the vehicle is the maximum turning angle of wheel 3 relative to the longitudinal vehicle axis. For the configuration that includes swivel-mounted drive unit 5, a first turning angle 20 is derived here that is larger than a second turning angle 21 that results when drive unit 5 is rigidly supported relative to the longitudinal vehicle axis as in the related art. This means it holds that $\beta_2 > \beta_1$.

The illustrated relationships hold independently of the specific realization of drive unit 5. It is practical, however, that the swiveling motion may be achieved using only one electric motor drive since, in the context of conventional combustion engine-based drive concepts, the aim is to achieve a vibration-optimized suspension that is difficult to design to have any appreciable swiveling capability. Examples of electric drive concepts, that may be implemented in connection with the present invention, are indicated in the following FIG. 2 through 5.

Figure 2:
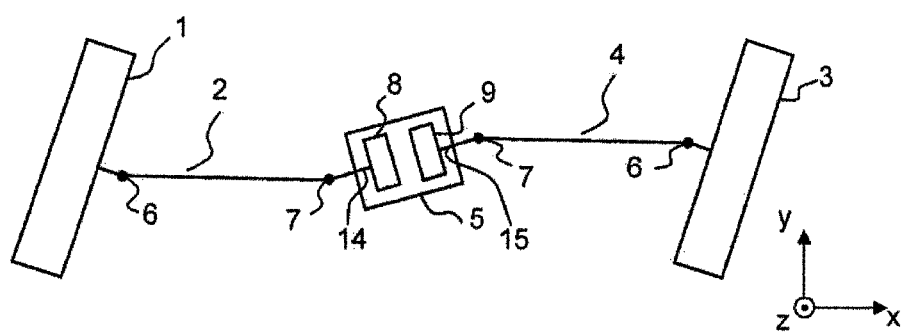
FIG. 2 shows a power train having a wheel-selective drive in accordance with a first specific embodiment of the present invention.

Thus, FIG. 2 shows a power train having a wheel-selective drive in accordance with a first specific embodiment of the present invention. In contrast to FIG. 1, both the left as well as right drive shafts 2, 4 and wheels 1, 3, which are operatively connected thereto, are shown.

Drive unit 5 includes a first and a second electric motor 8, 9. First electric motor 8 has a first rotor shaft 14 that is operatively connected to left drive shaft 2. Second electric motor 9 includes a second rotor shaft 15 that is operatively connected to right drive shaft 4. There is no mechanical coupling between the two electric motors 8, 9. They are merely configured in a shared housing that is disposed between the left and right drive shaft 2, 4. It is a question of a coaxial configuration. This means that, in the case of a straight-ahead vehicle travel, where drive shafts 2, 4 are not articulated at any of articulated joints 6, 7 thereof, the two rotor shafts 14, 15, together with drive shafts 2, 4 thereof, reside in a common axis.

Based on the configuration described here, a wheel-selective drive is possible. The speed and torque of the left drive side may be theoretically controlled independently of the speed and torque on the right drive side. A higher-level control assumes the setpoint selection of suitable nominal torque values for the left and right electric motor 8, 9 as a function of the momentary driving situation, and of the control commands transmitted by the driver, such as accelerator-pedal position and steering-wheel angle. In a lower-level closed-loop control circuit, a suitable setpoint value is finally derived from the torque setpoint selection for a current vector for each of the two motors 8, 9 and is applied to the motor windings by a converter.

In addition, the described power train is a direct drive. This means that there is no need for a gear transmission for stepping-up or stepping-down the speed, thereby eliminating gear transmission power losses. Advantageously suited for use as a motor type here, as well in the other specific embodiments shown are a permanently excited or externally excited synchronous motor, an asynchronous motor or also a switched reluctance motor. However, due to the high torque density thereof, a permanently excited synchronous motor is particularly suited for use in a gearless configuration. Equally conceivable are external-rotor, as well as internal-rotor motors. In principle, axial flux motors are suited in the same way as radial flux motors.

Figure 3:
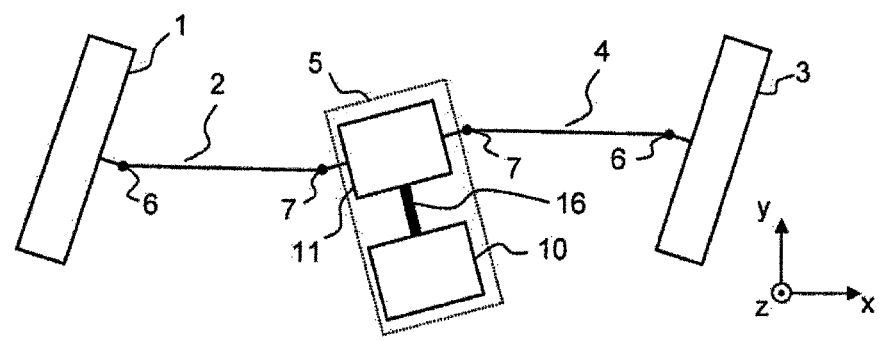
FIG. 3 shows a power train having a central drive in accordance with a second specific embodiment of the present invention.

FIG. 3 shows a power train having a central drive in accordance with a second specific embodiment of the present invention. In this case, a central electric motor 10 within drive unit 5 is operatively coupled to a differential gear 11. Unequal speeds in left and right wheel 1, 3 may be permitted by differential gear 11, in particular during cornering.

A rotor shaft 16 of central electric motor 10 is oriented orthogonally to the driven partial shafts of drive shafts 2, 4. Therefore, in the case of drive unit 5, it is a question of a longitudinal configuration. This, in turn, is suspended from the chassis so as to permit swiveling thereof relative to the straight-ahead direction in order to increase the maximum possible turning angle of the wheels. The swiveling range is oriented about the z-axis in the same way as the rotational degree of freedom of articulated joints 6, 7.

Besides differential gear 11, a reduction gear (not shown in the illustration) may also be additionally configured in the longitudinal direction, for example, between central electric motor 10 and differential gear 11. This makes it possible for a high-speed electric motor to be used whose radial dimensions are smaller than those of a low-speed electric motor of the same power.

Figure 4:
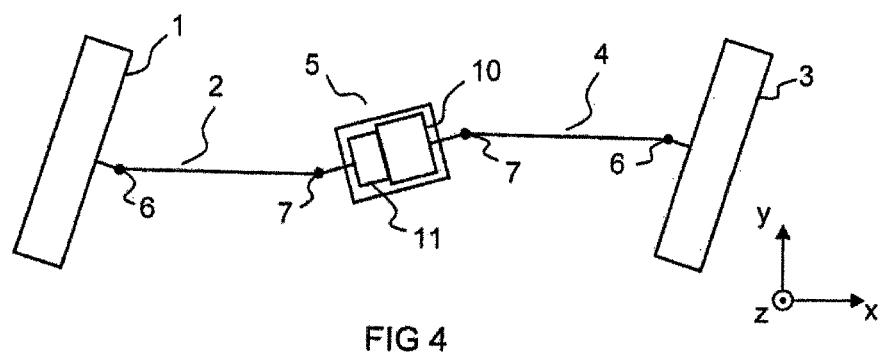
FIG. 4 shows a power train having a central drive in accordance with a third specific embodiment of the present invention.

FIG. 4 shows a power train having a central drive in accordance with a third specific embodiment of the present invention. Here as well, central electric motor 10 is operatively coupled to the differential gear within drive unit 5 and swivel-mounted about the z-axis that is oriented in the direction of the drawing plane. Similarly to the configuration of FIG. 2, however, the axes of central electric motor 10 and of differential gear 11 extend coaxially to the ends of drive shafts 2, 4 facing drive unit 5.

Figure 5:
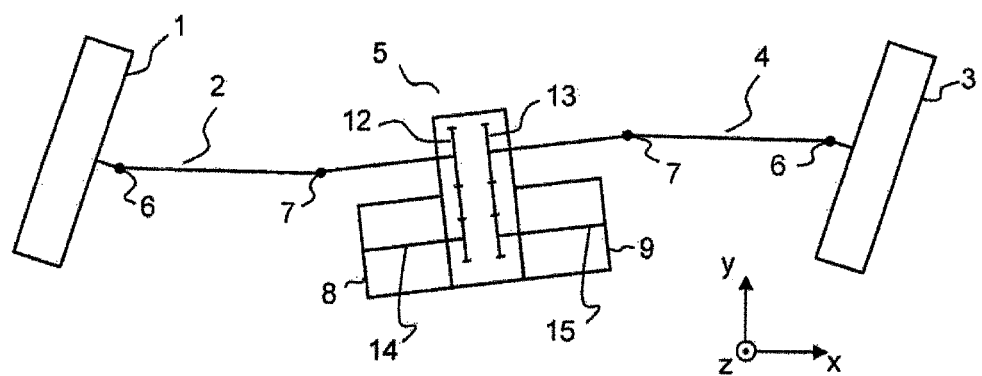
FIG. 5 shows a power train having a wheel-selective drive in accordance with a fourth specific embodiment of the present invention.

FIG. 5 shows a power train having a wheel-selective drive in accordance with a fourth specific embodiment of the present invention. As in FIG. 2, two electric motors 8, 9 are also provided here which are each operatively associated with a respective wheel 1, 3. Here, however, a speed reduction is provided from rotor shafts 14, 15 of electric rotors 8, 9 to drive shafts 2, 4. For this purpose, a gear transmission housing having a first and a second interconnecting gear unit 12, 13 is configured between the two electric motors 8, 9. The two interconnecting gear units 12, 13 are designed as spur-gear units. A first of these interconnecting gear units 12 operatively couples first electric motor 8 to left drive shaft 2, while a second of interconnecting gear units 13 operatively couples second electric motor 9 to right drive shaft 4. Since electric motors 8, 9 are designed in this manner for a comparatively high speed range, they may be realized with a relatively low axis height.

LIST OF REFERENCE NUMERALS 1 left wheel
2 left drive shaft
3 right wheel
4 right drive shaft
5 drive unit
6 wheel-proximal articulated joint
7 wheel-distal articulated joint
8 first electric motor
9 second electric rotor
10 central electric motor
11 differential gear
12 first interconnecting gear unit
13 second interconnecting gear unit
14 first rotor shaft
15 second rotor shaft
16 rotor shaft of the central electric motor
17 right angle
18 articulation angle of the wheel-proximal articulated joint $\alpha_2$
19 articulation angle of the wheel-proximal articulated joint $\alpha_1$
20 first turning angle $\beta_2$
21 second turning angle $\beta_1$

What is claimed is:

1. A power train for a vehicle, the power train comprising
a left drive shaft fixedly connected in terms of drive to a left steerable wheel;
a right drive shaft fixedly connected in terms of drive to a right steerable wheel;
a drive unit configured between the left and right drive shafts for driving the left and right drive shafts, the drive shafts being configured as articulated shafts each having a wheel-proximal articulated joint and a wheel-distal articulated joint; the articulated joints each having at least one axis of rotation with a same orientation for all the articulated joints, the drive unit being designed for transmitting an electromotively generated torque to the left and right drive shafts, the drive unit having a body suspension allowing the drive unit to rotate relative to a body of the vehicle about a swivel axis that extends in parallel to the at least one axis of rotation having the same orientation; wherein the drive unit includes a first electric motor for driving the left drive shaft and a second electric motor for driving the right drive shaft, wherein the first electric motor has a first rotor shaft oriented coaxially to the left and right drive shafts during straight-ahead travel of the vehicle and the second electric motor has a second rotor shaft oriented coaxially to the left and right drive shafts during straight-ahead travel of the vehicle.

2. The power train as recited in claim 1 wherein the drive unit includes:
a first interconnecting gear unit for operatively connecting the first rotor shaft of the first electric motor to the left drive shaft; and
a second interconnecting gear unit for operatively connecting the second rotor shaft of the second electric motor to the right drive shaft, the first and the second interconnecting gear units being configured in a shared housing, the first electric motor being mounted on the housing on a side of the housing facing the left wheel, the second electric motor being mounted on the housing on a side of the housing facing the right wheel.

3. A power train for a vehicle, the power train comprising
a left drive shaft fixedly connected in terms of drive to a left steerable wheel;
a right drive shaft fixedly connected in terms of drive to a right steerable wheel;
a drive unit configured between the left and right drive shafts for driving the left and right drive shafts, the drive shafts being configured as articulated shafts each having a wheel-proximal articulated joint and a wheel-distal articulated joint; the articulated joints each having at least one axis of rotation with a same orientation for all the articulated joints, the drive unit being designed for transmitting an electromotively generated torque to the left and right drive shafts, the drive unit having a body suspension allowing the drive unit to rotate relative to a body of the vehicle about a swivel axis that extends in parallel to the at least one axis of rotation having the same orientation wherein the drive unit includes a central electric motor including a rotor shaft for driving both the left and right drive shafts, the drive unit further including a differential gear, wherein the rotor shaft of the central electric motor is oriented coaxially to the left and right drive shafts during straight-ahead travel of the vehicle.

4. A power train for a vehicle, the power train comprising
a left drive shaft fixedly connected in terms of drive to a left steerable wheel;
a right drive shaft fixedly connected in terms of drive to a right steerable wheel;
a drive unit configured between the left and right drive shafts for driving the left and right drive shafts, the drive shafts being configured as articulated shafts each having a wheel-proximal articulated joint and a wheel-distal articulated joint; the articulated joints each having at least one axis of rotation with a same orientation for all the articulated joints, the drive unit being designed for transmitting an electromotively generated torque to the left and right drive shafts, the drive unit having a body suspension allowing the drive unit to rotate relative to a body of the vehicle about a swivel axis that extends in parallel to the at least one axis of rotation having the same orientation wherein the drive unit includes a central electric motor including a rotor shaft for driving both the left and right drive shafts, the drive unit further including a differential gear, wherein the central electric motor and the differential gear both rotate together about the swivel axis.

* * * * *